United States Patent
Fujiwara et al.

(10) Patent No.: US 6,833,411 B2
(45) Date of Patent: Dec. 21, 2004

(54) BLOCK COPOLYMER COMPOSITIONS

(75) Inventors: Masahiro Fujiwara, Oita (JP); Yukinori Nakamichi, Oita (JP)

(73) Assignee: Japan Elastomer Co., Ltd., Tokyo (JP)

(*) Notice: Subject to any disclaimer, the term of this patent is extended or adjusted under 35 U.S.C. 154(b) by 0 days.

(21) Appl. No.: 10/398,936

(22) PCT Filed: Aug. 6, 2002

(86) PCT No.: PCT/JP02/08029

§ 371 (c)(1),
(2), (4) Date: Apr. 11, 2003

(87) PCT Pub. No.: WO03/016405

PCT Pub. Date: Feb. 27, 2003

(65) Prior Publication Data

US 2003/0191241 A1 Oct. 9, 2003

(30) Foreign Application Priority Data

Aug. 13, 2001 (JP) ........................................ 2001-245237
Aug. 15, 2001 (JP) ........................................ 2001-246474

(51) Int. Cl.$^7$ ............................................. C08L 23/08
(52) U.S. Cl. ........................ 525/240; 525/241; 525/242; 525/244
(58) Field of Search ................................ 525/240, 241, 525/242, 244

(56) References Cited

U.S. PATENT DOCUMENTS 6,143,832 A * 11/2000 Toyoshima et al. ......... 525/314
6,462,137 B2 * 10/2002 Li et al. ...................... 525/314
6,706,813 B2 * 3/2004 Chiba et al. .................. 525/95

FOREIGN PATENT DOCUMENTS

| | | |
|---|---|---|
| EP | 0 940 440 A1 | 9/1999 |
| JP | 45-19388 B | 7/1970 |
| JP | 47-43618 B | 4/1972 |
| JP | 47-17319 B | 9/1972 |
| JP | 54-57523 A | 5/1979 |
| JP | 3-181552 A | 8/1991 |
| JP | 6-41439 A | 2/1994 |
| JP | 6-73246 A | 3/1994 |
| JP | 6-279650 A | 4/1994 |
| JP | 6-814254 A | 7/1994 |
| JP | 8-34884 A | 2/1996 |
| JP | 9-511260 A | 11/1997 |
| JP | 10-212416 A | 8/1998 |
| JP | 2000-219781 A | 8/2000 |
| JP | 2000-290465 A | 10/2000 |

* cited by examiner

Primary Examiner—Robert D. Harlan
(74) Attorney, Agent, or Firm—Birch, Stewart, Kolasch & Birch, LLP

(57) ABSTRACT

A subject for the invention is to provide an asphalt composition excellent in high-temperature storage stability and low-temperature characteristics and having an excellent balance among properties.

Another subject is to provide a resin composition which has a reduced gel content, satisfactory appearance, and excellent balance among properties including impact resistance and is especially suitable for use as thin films such as food wrap films, films for laminating, and heat-shrinkable films or transparent sheet moldings such as trays for foods or for parts of light electrical appliances, etc., blister cases, or the like.

6 Claims, No Drawings

BLOCK COPOLYMER COMPOSITIONS

This application is the national phase under 35 U.S.C. § 371 of PCT International Application No. PCT/JP02/08029 which has an International filing date of Aug. 6, 2002, which designated the United States of America.

TECHNICAL FIELD

The present invention relates to thermoplastic resin compositions which are reduced in the formation of a gel (crosslinked polymer) due to a block copolymer crosslinking reaction during molding, are reduced in melt viscosity change due to crosslinking and cleavage of block copolymer chains, and are excellent in suitability for film or sheet forming and suitability for injection molding, and to an asphalt composition which is excellent in high-temperature storage stability and low-temperature characteristics and has an excellent balance among properties. More particularly, the invention relates to resin compositions comprising a specific block copolymer comprising a vinylaromatic hydrocarbon, isoprene and 1,3-butadiene, and at least one thermoplastic resin selected from styrene resins, polyolefin resins and poly(phenylene ether) resins, and to an asphalt composition comprising a block copolymer of a specific structure comprising a vinylaromatic hydrocarbon, isoprene and 1,3-butadiene, and an asphalt.

BACKGROUND ART

Block copolymers comprising a conjugated diene and a vinylaromatic hydrocarbon have satisfactory compatibility with resins such as polystyrene and are advantageously used for improving the impact resistance of these resins.

For example, JP-B-45-19388 and JP-B-47-43618 describe the use of a linear block copolymer or a branched block copolymer as an impact modifier for polystyrene.

On the other hand, it has been attempted to incorporate an olefin resin for the purpose of improving the oil resistance of styrene resins. However, since styrene resins have poor compatibility with olefin resins, there has been a problem that the incorporation results in a composition which suffers a separation phenomenon and has poor mechanical strength. A composition comprising a polyolefin resin and a polystyrene resin and containing a hydrogenated block copolymer has hence been proposed in, e.g., JP-A-56-38338.

Poly(phenylene ether) resins are excellent in mechanical properties, electrical properties, etc. and are extensively used as business apparatus housings, various industrial parts, and the like. Especially for use in applications such as business apparatus and acoustic appliances, where damping performance is required, a poly(phenylene ether) resin composition containing a block copolymer in which the content of 3,4-bonds and 1,2-bonds (vinyl bonds) in the diene units is 40% or higher is disclosed in, e.g., JP-A-3-181552.

Poly(phenylene ether) resins are inferior in oil resistance and impact resistance, and it has been attempted to incorporate an olefin resin in order to improve these properties. However, since these two kinds of resins have poor compatibility, the incorporation has posed a problem that a separation phenomenon occurs. A composition comprising a polypropylene resin and poly(phenylene ether) and containing a hydrogenated block copolymer has hence been proposed in, e.g., JP-A-9-12800.

On the other hand, asphalt compositions are extensively used in applications such as road paving, waterproof sheets, sound insulation sheets, and roofing. Many attempts have been made to improve properties of asphalts for such applications by adding various polymers thereto. For example, JP-B-47-17319 discloses an asphalt composition containing a block copolymer of a vinylaromatic compound and a conjugated diene compound. Furthermore, JP-A-54-57524 discloses an asphalt composition containing a radial teleblock copolymer.

An object of the invention is to provide a resin composition which comprises a block copolymer and a polystyrene resin and/or poly(phenylene ether) resin and which is reduced in gel formation due to a block copolymer crosslinking reaction during molding, is reduced in melt viscosity change due to crosslinking and cleavage of block copolymer chains, and has satisfactory low-temperature impact resistance and excellent suitability for film or sheet forming and injection molding. Another object of the invention is to provide a resin composition which comprises a block copolymer and a polyolefin resin, polystyrene resin, and/or poly(phenylene ether) resin and which has improved impact resistance besides those properties.

A still other object of the invention is to provide an asphalt composition which contains a specific block copolymer comprising a vinylaromatic hydrocarbon and a conjugated diene and which has an excellent balance among properties such as softening point, strength, and workability, is excellent in high-temperature storage stability and low-temperature characteristics, and is suitable for use in road paving applications, roofing/waterproof sheet applications, sealant applications, and the like.

DISCLOSURE OF THE INVENTION

It was found that use of a thermoplastic resin selected from styrene resins, polyolefin resins, and poly(phenylene ether) resins in combination with a block copolymer comprising a vinylaromatic hydrocarbon, isoprene, and 1,3-butadiene and having a specific polymer structure is effective in reducing the gel formation due to a block copolymer crosslinking reaction during molding to thereby considerably reduce the gel level (fish eyes) and in simultaneously reducing the melt viscosity change due to crosslinking and cleavage of block copolymer chains and attaining excellent low-temperature impact resistance, etc. It was also found that in a composition comprising a combination of a thermoplastic resin selected from styrene resins, polyolefin resins, and poly(phenylene ether) resins with a specific hydrogenated block copolymer and a block copolymer comprising a vinylaromatic hydrocarbon, isoprene and 1,3-butadiene and having a specific polymer structure, the specific hydrogenated block copolymer improves the compatibility of the styrene resin and/or poly(phenylene ether) resin with the polyolefin resin, while the block copolymer comprising a vinylaromatic hydrocarbon, isoprene, and 1,3-butadiene and having a specific polymer structure blends preferentially with the styrene resin and/or poly(phenylene ether) resin to form a homogeneous mixture and thereby improve impact resistance. The invention has been completed based on these findings.

On the other hand, extensive investigations were made on property improvements in compositions which comprise an asphalt and a block copolymer comprising a vinylaromatic hydrocarbon and a conjugated diene and are to be used in road paving applications, roofing/waterproof sheet applications, sealant applications, or the like. As a result, it was found that an asphalt composition which comprises an asphalt and a block copolymer comprising a vinylaromatic hydrocarbon and conjugated dienes and are excellent in high-temperature storage stability and low-temperature characteristics is obtained by using isoprene and 1,3-butadiene as the conjugated dienes in a proportion within a specific range and so as to result in a specific vinyl bond amount. The invention has been thus completed.

Namely, the invention relates to the following compositions.

(1) A composition comprising:
(A) from 2 to 40 parts by weight of a block copolymer which is a block copolymer having at least two polymer blocks mainly comprising a vinylaromatic hydrocarbon and further having at least one copolymer block comprising isoprene and 1,3-butadiene and/or at least one copolymer block comprising isoprene, 1,3-butadiene and a vinylaromatic hydrocarbon, the block copolymer having a vinylaromatic hydrocarbon content of from 5% by weight to less than 60% by weight and a total content of isoprene and 1,3-butadiene of from more than 40% by weight to 95% by weight, and the block copolymer having an isoprene/1,3butadiene weight ratio in the range of from 95/5 to 5/95, a vinyl bond amount less than 40% by weight, and a number-average molecular weight in the range of from 30,000 to 500,000; and
(B) from 98 to 60 parts by weight of either at least one thermoplastic resin selected from styrene resins, polyolefin resins, and poly(phenylene ether) resins or an asphalt.

(2) A resin composition obtained by compounding 100 parts by weight of a resin composition comprising:
(A) from 2 to 40 parts by weight of a block copolymer which is a block copolymer having at least two polymer blocks mainly comprising a vinylaromatic hydrocarbon and further having at least one copolymer block comprising isoprene and 1,3-butadiene and/or at least one copolymer block comprising isoprene, 1,3-butadiene and a vinylaromatic hydrocarbon, the block copolymer having a vinylaromatic hydrocarbon content of from 5% by weight to less than 60% by weight and a total content of isoprene and 1,3-butadiene of from more than 40% by weight to 95% by weight, and the block copolymer having an isoprene/1,3butadiene weight ratio in the range of from 95/5 to 5/95, a vinyl bond amount less than 40% by weight, and a number-average molecular weight in the range of from 30,000 to 500,000; and
(B) from 98 to 60 parts by weight of at least one thermoplastic resin selected from styrene resins, polyolefin resins, and poly(phenylene ether) resins, with
(C) from 2 to 30 parts by weight of a hydrogenated block copolymer comprising a vinylaromatic hydrocarbon and a conjugated diene and having a vinylaromatic hydrocarbon content of from 5 to 90% by weight and a degree of hydrogenation of 20% or higher.

BEST MODE FOR CARRYING OUT THE INVENTION

The invention will be explained below in detail.

The block copolymer to be used as ingredient (A) in the invention is obtained by polymerizing a vinylaromatic hydrocarbon with isoprene and 1,3-butadiene in an organic solvent using an organolithium compound as an initiator.

Examples of hydrocarbon solvents for use in producing the block copolymer include aliphatic hydrocarbons such as butane, pentane, hexane, isopentane, heptane, octane, and isooctane, alicyclic hydrocarbons such as cyclopentane, methylcyclopentane, cyclohexane, methylcyclohexane, and ethylcyclohexane, aromatic hydrocarbons such as benzene, toluene, ethylbenzene, and xylene, and the like. These may be used either alone or as a mixture of two or more thereof. Examples of the vinylaromatic hydrocarbon to be used for the block copolymer include styrene, o-methylstyrene, p-methylstyrene, p-tert-butylstyrene, 1,3-dimethylstyrene, α-methylstyrene, vinylnaphthalene, vinylanthracene, 1,1-diphenylethylene, and the like. However, especially general ones include styrene. These may be used either alone or as a mixture of two or more thereof.

From the standpoints of impact resistance and compatibility with the thermoplastic resin as ingredient (B) in the resin compositions to be obtained according to the invention and from the standpoint of a property balance in the asphalt composition to be obtained according to the invention, the content of the vinylaromatic hydrocarbon in the block copolymer is from 5% by weight to less than 60% by weight, preferably from 10 to 50% by weight, more preferably from 15 to 45% by weight, and the total content of isoprene and 1,3-butadiene is more than 40% by weight to 95% by weight, preferably from 50 to 90% by weight, more preferably from 55 to 85% by weight.

The weight ratio of isoprene to 1,3-butadiene in the block copolymer as ingredient (A) is from 95/5 to 5/95, preferably from 90/10 to 10/90, more preferably from 85/15 to 15/85, from the standpoints of melt viscosity change during molding and impact resistance in the resin compositions and from the standpoint of high-temperature storage stability in the asphalt composition. In the case where a resin composition especially having excellent low-temperature impact resistance is to be obtained or where an asphalt composition especially having excellent low-temperature characteristics is to be obtained, it is recommended that the weight ratio of isoprene to 1,3-butadiene should be from 60/40 to 5/95, preferably from 55/45 to 10/90, more preferably from 50/50 to 15/85.

The vinyl bond amount in the block copolymer (A) as a component in the invention is less than 40% by weight, preferably 35% by weight or lower, more preferably from 30 to 10% by weight. Especially in the resin compositions, it is recommended that the vinyl bond amount should be preferably less than 30% by weight, more preferably from 27 to 10% by weight, from the standpoint of low-temperature impact resistance.

The term vinyl bond amount herein means the proportion of the butadiene and isoprene which have been incorporated in the forms of 1,2-bond and 3,4-bond in the butadiene and isoprene incorporated in the bond forms of 1,2-bond, 3,4-bond, and 1,4-bond in the block copolymer.

For obtaining a resin composition or asphalt composition having satisfactory low-temperature characteristics, it is recommended that the block copolymer to be used in the invention should be one in which the main dispersion peak of tanδ determined through a viscoelasticity examination and attributable to the copolymer block comprising isoprene and 1,3-butadiene and/or copolymer block comprising isoprene, 1,3-butadiene, and a vinylaromatic hydrocarbon appears at below 0° C., preferably below −20° C., more preferably below −25° C.

In the case where a resin composition having excellent impact resistance is to be obtained in the invention and used for forming a molded article with satisfactory rigidity therefrom or where an asphalt composition having even better high-temperature storage stability is to be obtained in the invention, it is recommended that the proportion of vinylaromatic hydrocarbon polymer blocks incorporated in the block copolymer (A) (referred to as block percentage of the vinylaromatic hydrocarbon) should be regulated to from 50 to 100% by weight, preferably from 50 to 97% by weight, more preferably from 60 to 95% by weight, most preferably from 70 to 92% by weight.

The block percentage of the vinylaromatic hydrocarbon incorporated in a block copolymer can be determined by treating the block copolymer by the method of oxidative decomposition with tert-butyl hydroperoxide with the aid of osmium tetroxide as a catalyst (the method described in I. M. KOLTHOFF, et al., *J. Polym. Sci.* 1, 429(1946)) to obtain vinylaromatic hydrocarbon polymer block components (provided that the vinylaromatic hydrocarbon polymer block components having an average degree of polymerization of about 30 or lower have been removed) and determining the block percentage from the amount of these polymer components using the following equation.

Block percentage of vinylaromatic hydrocarbon (wt %)=[(weight of vinylaromatic hydrocarbon polymer blocks in the block copolymer)/(weight of all vinylaromatic hydrocarbon in the block copolymer)]×100

The block percentage of the vinylaromatic hydrocarbon can be controlled by changing, for example, the weights of the vinylaromatic hydrocarbon, isoprene and 1,3-butadiene or the weight ratio or polymerizability ratio between these ingredients in the step of copolymerizing the vinylaromatic hydrocarbon, isoprene and 1,3-butadiene in the production of the block copolymer (A). Specifically, use can be made of, e.g., a method in which a mixture of the vinylaromatic hydrocarbon, isoprene and 1,3-butadiene is continuously fed to a polymerization system and polymerized and/or a polar compound or randomizing agent is used to copolymerize the vinylaromatic hydrocarbon, isoprene and 1,3-butadiene. Examples of the polar compound or randomizing agent include ethers such as tetrahydrofuran, diethylene glycol dimethyl ether, and diethylene glycol dibutyl ether, amines such as triethylamine and tetramethylethylenediamine, thioethers, phosphines, phosphoramides, alkylbenzenesulfonic acid salts, potassium or sodium alkoxides, and the like. These polar compounds or randomizing agents can be used also for regulating the vinyl bond amount.

The block copolymer (A) in the invention is a block copolymer having at least two polymer blocks mainly comprising a vinylaromatic hydrocarbon and further having at least one copolymer block comprising isoprene and 1,3-butadiene and/or at least one copolymer block comprising isoprene, 1,3-butadiene, and a vinylaromatic hydrocarbon.

Examples of the block copolymer (A) include linear block copolymers represented by the general formulae (a) S—(D-S)$_n$ (b) S—(D-S)$_n$—D (c) D-(S—D)$_{n+1}$ and linear block copolymers or radial block copolymers represented by the following general formulae.

(d) [(S—D)$_k$]$_{n+1}$—X (e) [(S—D)$_k$—S]$_{n+1}$—X (f) [(D—S)k]$_{n+1}$—X (g) [(D—S)k—D]$_{n+1}$—X

The block copolymer (A) preferably is a linear block copolymer from the standpoint of obtaining an excellent property balance in the case of obtaining the asphalt composition of the invention.

[In the formulae given above, S represents a polymer block mainly comprising a vinylaromatic hydrocarbon. D represents a copolymer block comprising isoprene and 1,3-butadiene and/or a copolymer block comprising isoprene, 1,3-butadiene, and a vinylaromatic hydrocarbon and having a vinylaromatic hydrocarbon content less than 70% by weight. X represents either a residue of a coupling agent such as, e.g., silicon tetrachloride, tin tetrachloride, epoxidized soybean oil, polyhalogenated hydrocarbon, carboxylic acid ester, or polyvinyl compound or a residue of an initiator such as a polyfunctional organolithium compound. Furthermore, n, k and m are integers of 1 or larger, generally from 1 to 5.)

The polymer block shown above mainly comprising a vinylaromatic hydrocarbon is a block which is a vinylaromatic hydrocarbon homopolymer and/or a copolymer of a vinylaromatic hydrocarbon with 1,3-butadiene and/or isoprene and comprises at least 70% by weight the vinylaromatic hydrocarbon. In the invention, 1,3-butadiene homopolymer segments and/or isoprene homopolymer segments may coexist in the blocks D. Furthermore, a 1,3-butadiene homopolymer block and/or an isoprene homopolymer block may coexist as a block D in the block copolymer as long as the block copolymer has the at least one copolymer block comprising isoprene and 1,3-butadiene and/or at least one copolymer block comprising isoprene, 1,3-butadiene, and a vinylaromatic hydrocarbon as specified in the invention.

In the case where the asphalt composition of the invention is obtained, the block copolymer (A) may be a block copolymer composition comprising:

(A-1) from 10 to 90% by weight, preferably from 20 to 80% by weight, block copolymer having one polymer block mainly comprising a vinylaromatic hydrocarbon and further having one copolymer block comprising isoprene and 1,3-butadiene and/or one copolymer block comprising isoprene, 1,3-butadiene, and a vinylaromatic hydrocarbon; and (A-2) from 90 to 10% by weight, preferably from 80 to 20% by weight, block copolymer having at least two polymer blocks mainly comprising a vinylaromatic hydrocarbon and further having at least one copolymer block comprising isoprene and 1,3-butadiene and/or at least one copolymer block comprising isoprene, 1,3-butadiene, and a vinylaromatic hydrocarbon. By using this block copolymer composition, an asphalt composition having an excellent balance between softening point and solubility, workability, or high-temperature storage stability can be obtained.

For use in obtaining the asphalt composition of the invention, the block copolymer (A) may have been hydrogenated as long as the excellent effects of the invention can be produced.

The molecular weight of the block copolymer (A) to be used in the invention, in terms of number-average molecular weight measured by GPC and calculated for standard polystyrene, is from 30,000 to 500,000, preferably from 50,000 to 450,000, more preferably from 70,000 to 400,000, from the standpoints of the impact resistance and workability of the resin composition to be obtained or from the standpoints of the softening point, mechanical strength, solubility, etc. of the asphalt composition to be obtained.

In the invention, a terminal-modified block copolymer comprising a polymer chain and, bonded to at least one end thereof, a polar-group-containing group of atoms can be used as the block copolymer (A). Examples of the polar-group-containing group of atoms include groups of atoms containing at least one polar group selected from a hydroxyl group, carboxyl group, carbonyl group, thiocarbonyl group, acid halide group, acid anhydride group, carboxy group, thiocarboxy group, aldehyde group, thioaldehyde group, carboxylic ester group, amide group, sulfo group, sulfonic ester group, phosphate group, phosphoric ester group, amino group, imino group, nitrile group, pyridyl group, quinoline group, epoxy group, thioepoxy group, sulfide group, isocyanate group, isothiocyanate group, halogenosilicon group, alkoxysilicon group, halogenotin group, alkoxytin group, phenyltin group, and the like. The terminal-modified block copolymer is obtained by reacting a compound having any of these polar-group-containing groups of atoms at the time when polymerization for block copolymer production has been terminated. As the compound having a polar-group-containing group of atoms can, for example, be used the terminal modifier described in JP-B-4-39495.

At least one stabilizer selected from 2-[1-(2hydroxy-3,5-di-t-pentylphenyl)ethyl]-4,6-di-t-pentylphenyl acrylate, 2-t-butyl-6-(3-t-butyl-2-hydroxy-5-methylbenzyl)$_4$-methylphenyl acrylate and 2,4-bis((octylthio)methyl]-o-cresol may be added as a stabilizer in the invention in an amount of from 0.05 to 3 parts by weight, preferably from 0.1 to 2 parts by weight, per 100 parts by weight of the block copolymer in order to obtain a resin composition having even higher thermal stability during high-temperature molding or in order to obtain an asphalt composition having even higher-thermal stability during high-temperature melting, storage, and application.

At least one phenolic stabilizer such as n-octadecyl 3-(3,5-di-t-butyl-4-hydroxyphenyl)propionate, tetrakis[methylene-3-(3,5-di-t-butyl-4-hydroxyphenyl)propionato]methane, 1,3,5-trimethyl-2,4,6-tris(3,5-di-t-butyl-4-hydroxybenzyl)benzene or 2,4-bis(n-octylthio)-6-(4-hydroxy-3,5-di-t-butylanilino)-1,3,5-triazine can be added in the invention in an amount of from 0.05 to 3 parts by weight per 100 parts by weight of the block copolymer. Furthermore, at least one organic phosphate or organic phosphite stabilizer such as tris(nonylphenyl) phosphite, 2,2-methylenebis(4,6-di-t-butylphenyl) octyl phosphite, 2-[[2,4,8,10-tetrakis(1,1-dimethylethyl)dibenzo[d,f][1,3,2]dioxaphosphepin-6-yl]oxy]-N,N-bis[2-[[2,4,8,10-tetrakis(1,1 dimethylethyl)dibenzo[d,f][1,3,2]dioxaphosphepin-6-yl]oxy]ethyl]ethanamine or tris(2,4-di-t-butylphenyl) phosphite can be added in the invention in an amount of from 0.05 to 3 parts by weight per 100 parts by weight of the block copolymer.

The styrene resins which may be used as ingredient (B) in the invention are conjugated diene compound/vinylaromatic compound block copolymer resins having a vinylaromatic compound content of 60% by weight or higher, non-rubber-modified styrene polymers, impact-resistant polystyrene resins (HIPS) obtained by mixing or graft-polymerizing a rubber such as a butadiene rubber, styrene/butadiene rubber, or ethylene/propylene rubber, and rubber-modified styrene resins such as acrylonitrile/butadiene/styrene copolymer resins (ABS) and methacrylic ester/butadiene/styrene copolymer resins (MBS). The non-rubber-modified styrene polymers are polymers of at least one styrene monomer selected from styrene and alkyl-substituted styrenes, styrenes having an alkyl-substituted nucleus, styrenes having a halogen-substituted nucleus, and the like, such as α-methylstyrene, methylstyrene, ethylstyrene, isopropylstyrene, dimethylstyrene, p-methylstyrene, chlorostyrene, bromostyrene, and vinylxylene, and copolymers of at least one member selected from these styrene monomers with at least one other monomer copolymerizable therewith shown below in which the styrene monomer is contained in an amount of 50% by weight or larger, preferably 70% by weight or larger. Examples of the monomer copolymerizable with the styrene monomers include acrylonitrile, acrylic acid and esters thereof (e.g., esters in which the alcohol moiety is an alkyl having 1 to 12 carbon atoms, such as methyl acrylate, ethyl acrylate, propyl acrylate, and butyl acrylate), methacrylic acid and esters thereof (e.g., esters in which the alcohol moiety is the same as that shown above, such as methyl methacrylate, ethyl methacrylate, and butyl methacrylate), α,β-unsaturated dicarboxylic acids such as fumaric acid, maleic acid, and itaconic acid and monoesters, diesters, anhydrides, and imides of these (e.g., maleic anhydride, maleimide, and the like), and the like. Preferred styrene resins are polystyrene, rubber-modified impact-resistant polystyrenes, styrene/n-butyl acrylate copolymers, styrene/methyl methacrylate copolymers, and the like. These styrene resins can be used alone or as a mixture of two or more thereof. The styrene resin to be used in the invention has a melt flow rate (MFR: 200° C., 5-kg load) of preferably from 0.5 to 30 g/10 min, more preferably from 1 to 20 g/10 min.

The polyolefin resins which may be used as ingredient (B) in the invention are not particularly limited as long as these are resins obtained by polymerizing one or more α-olefins, e.g., ethylene, propylene, 1-butene, isobutylene, and 4-methyl-1-pentene. The copolymers may be either random copolymers or block copolymers, and may contain a thermoplastic olefin elastomer such as a copolymer rubber formed from two or more α-olefins or a copolymer of an α-olefin and other monomer(s). Examples of such copolymer rubbers include ethylene/propylene copolymer rubbers (EPR), ethylene/butene copolymer rubbers (EBR), ethylene/hexene copolymer rubbers, ethylene/octene copolymer rubbers, ethylene/propylene/diene copolymer rubbers (EPDM), and the like. Preferred of these are polypropylene and polyethylene which are homopolymers or block polymers. The polyolefin resin in the invention has a melt flow rate (MFR: 230° C., 2.16-kg load) of preferably from 0.5 to 60 g/10 min, more preferably from 1 to 20 g/10 min.

Furthermore, the poly(phenylene ether) resins which may be used as ingredient (B) in the invention are polymers or copolymers of 2,6-dimethylphenol or derivatives thereof (e.g., those in which the phenyl group has, bonded thereto, one or more of halogens, alkyl groups having 1 to 7 carbon atoms, phenyl group, haloalkyl groups, aminoalkyl groups, hydrocarbon-oxy groups, and halohydrocarbon-oxy groups). Examples thereof include poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether), copolymers of 2,6-dimethylphenol and other phenol(s) (e.g.,. 2,3, 6trimethylphenol or 2-methyl-6-butylphenol), graft-modified poly(2,6-dimethyl-1,4-phenylene ethers) obtained by graft-polymerizing styrene, α-methylstyrene, an acrylic ester, a methacrylic ester, acrylonitrile, methacrylonitrile, or the like with poly(2,6-dimethyl-1,4-phenylene ether), and the like. These poly(phenylene ether) resins have a reduced viscosity (0.5 g/dL; chloroform solution; measured at 30° C.) of generally in the range of from 0.15 to 0.7, preferably from 0.2 to 0.6.

Examples of the asphalt which may be used as ingredient (B) in the invention include ones obtained as by-products of petroleum refining (petroleum asphalts) or as natural products (natural asphalts), ones obtained by mixing these with a petroleum, and the like. The main component of these asphalts is the material called bitumen. Specifically, use can be made of a straight asphalt, semi-blown asphalt, blown asphalt, cutback asphalt to which a tar, pitch, or oil has been added, asphalt emulsion, or the like. These may be used as a mixture thereof. A preferred asphalt for use in the invention is a straight asphalt having a penetration of from 30 to 300, preferably from 40 to 200, more preferably from 45 to 150. In the asphalt composition of the invention, the blending ratio between the block copolymer and the asphalt is from 2/98 to 40/60, preferably from 3/97 to 30/70, more preferably from 3/97 to 20/80.

The hydrogenated block copolymer which may be used as ingredient (C) in the invention is a product of hydrogenation of the block copolymer described above comprising a vinylaromatic hydrocarbon and a conjugated diene. From the standpoint of compatibility with styrene resins and poly(phenylene ether) resins, the degree of hydrogenation thereof is 20% or higher, preferably 30% or higher, more preferably 40% or higher. In the case where a resin composition having even better low-temperature characteristics is obtained, it is recommended that the degree of hydrogenation thereof should be from 20% to less than 70%, preferably from 35% to less than 65%, more preferably from 37 to 60%. From the standpoint of functioning as a compatibilizing agent for styrene resins and/or poly(phenylene ether) resins with polyolefin resins, the hydrogenated block copolymer of ingredient (C) has a vinylaromatic hydrocarbon content of from 10 to 90% by weight, preferably from 20 to 80% by weight, more preferably from 30 to 75% by weight.

The unhydrogenated block copolymer for ingredient (C) can be a block copolymer having the same structure and molecular weight as ingredient (A). However, the conjugated diene is not limited to isoprene and butadiene, and use can be made of butadiene alone, isoprene alone, or another diolefin having a pair of conjugated double bonds, e.g., 2,3-dimethyl-1,3-butadiene, 1,3-pentadiene, or 1,3hexadiene. It is recommended that in the unhydrogenated block copolymer, the vinyl bond amount attributable to the conjugated diene compound should be from 20% to less than 75%, preferably from 25 to less than 65%, more preferably from 30 to 60%. The term vinyl bond amount herein means the proportion of the conjugated diene compound which has been incorporated in the forms of 1,2-bond and 3,4-bond in the conjugated diene compound incorporated in the bond forms of 1,2-bond, 3,4-bond, and 1,4-bond in the block copolymer.

The proportion of each component in the resin compositions of the invention is as follows.

In the case of the two-component system (1) described above, the proportion of the block copolymer (A) is from 2 to 40 parts by weight, preferably from 4 to 35 parts by weight, more preferably from 6 to 30 parts by weight, and that of ingredient (B), which is at least one thermoplastic resin selected from styrene resins, polyolefin resins, and poly(phenylene ether) resins, is from 98 to 60 parts by weight, preferably from 95 to 65 parts by weight, more preferably from 93 to 70 parts by weight, from the standpoints of the impact resistance and rigidity of the resin composition to be obtained.

In the case of the three-component system (2) described above, the proportion of the block copolymer (A) is from 2 to 40% by weight, preferably from 4 to 35% by weight, more preferably from 6 to 30% by weight, and that of ingredient (B), which is at least one thermoplastic resin selected from styrene resins, polyolefin resins, and poly(phenylene ether) resins, is from 98 to 60% by weight, preferably from 95 to 65% by weight, more preferably from 93 to 70% by weight. Furthermore, the proportion of the hydrogenated block copolymer of ingredient (C) is from 2 to 30 parts by weight, preferably from 3 to 20 parts by weight, more preferably from 5 to 15 parts by weight, per 100 parts by weight of the sum of ingredients (A) and (B) from the standpoints of compatibilizing effect and rigidity. In the case where one or more styrene resins and/or one or more poly(phenylene ether) resins (referred to as ingredient B1) are used in combination with one or more polyolefin resins (referred to as ingredient B-2) in the resin composition (2), the proportion of ingredient B-1 to ingredient B-2 is 95-5/5-95, preferably 90-10/10-90, more preferably 80-20/20-80, from the standpoint of a balance between rigidity and heat resistance or oil resistance.

The resin compositions of the invention can be produced by any compounding method which has been known. For example, use is made of: a melt kneading method using a general mixing machine such as an open roll mill, intensive mixer, internal mixer, co-kneader, continuous kneading machine equipped with a twin-screw rotor, or extruder; a method in which the ingredients are dissolved or dispersed in a solvent and mixed together and the solvent is then removed with heating; or the like.

Various additives can be incorporated into the resin compositions of the invention according to need. Examples of these additives include additives for general use in plastic compounding, such as, e.g., inorganic reinforcements such as glass fibers, glass beads, silica, calcium carbonate, and talc, organic reinforcements such as organic fibers and coumarone-indene resins, crosslinking agents such as organic peroxides and inorganic peroxides, pigments such as titanium white, carbon black, and iron oxide, dyes, flame retardants, antioxidants, ultraviolet absorbers, antistatic agents, lubricants, plasticizers, other extenders, and mixtures of these.

Methods of mixing for producing the asphalt composition of the invention are not particularly limited. The composition can be prepared through heating, melting, and kneading with, e.g., a melting tank, kneader, Banbury mixer, extruder, or the like optionally together with the various additives mentioned above.

Various additives can be incorporated into the asphalt composition of the invention according to need. Examples of these additives include inorganic fillers such as calcium carbonate, magnesium carbonate, talc, silica, alumina, titanium oxide, glass fibers, and glass beads, organic reinforcements such as organic fibers and coumarone-indene resins, crosslinking agents such as organic peroxides and inorganic peroxides, pigments such as titanium white, carbon black, and iron oxide, dyes, flame retardants, antioxidants, ultraviolet absorbers, antistatic agents, lubricants, softeners/plasticizers such as paraffinic process oils, naphthenic process oils, aromatic process oils, paraffins, organic polysiloxanes, and mineral oils, tackifier resins such as coumarone-indene resins and terpene resins, polyolefin resins such as atactic polypropylene and ethylene/ethyl acrylate copolymers, vinylaromatic-based thermoplastic resins having a low molecular weight, natural rubber, synthetic rubbers such as polyisoprene rubbers, ethylene/propylene rubbers, chloroprene rubbers, acrylic rubbers, isoprene/isobutylene rubbers, and styrene/butadiene block copolymers or styrene/isoprene block copolymers other than those according to the invention, vulcanizing agents such as sulfur, vulcanization aids, other extenders, and mixtures of these. In particular, when the asphalt composition of the invention is for use in road paving, the composition is mixed with an ordinary mineral aggregate such as crushed stones, sand, or slag before use.

EXAMPLES

Examples of the invention will be described below, but these should not be construed as limiting the scope of the invention.

In Table 1 are shown the block copolymers used in the Examples and Comparative Examples. The block copolymers were produced by adding monomers in the orders and amounts shown in the column Polymer Structure in Table 1 and polymerizing these in cyclohexane solvent using n-butyllithium as an initiator. The vinyl bond amount was regulated by changing the amount of tetramethylethylenediamine to be used. After completion of the polymerization, methanol was added to terminate the polymerization reaction. Thereafter, the stabilizers shown in the note section of Table 1 were added in the amounts shown therein, and the solvent was distilled off to recover the block copolymers.

Properties of the block copolymers were determined in the following manners.

(1) Styrene Content

Calculated from the absorption intensity at 262 nm measured with an ultraviolet spectrophotometer (Hitachi UV200).

(2) Vinyl Bond Amount

Calculated by the Hampton method using an infrared spectrophotometer (Model 1710, manufactured by PerkinElmer).

(3) Number-Average Molecular Weight of Block Copolymer:

Number-average molecular weight was determined from a chromatogram obtained by GPC (Apparatus: manufactured by Waters Inc. Columns: combination of three columns, i.e., two ZORBAXPSM1000-S columns and one PSM60-S column, manufactured by E.I. du Pont de Nemours & Co. Tetrahydrofuran was used as solvent. Measuring conditions were temperature of 35° C., flow rate of 0.7 mL/min, sample concentration of 0.1% by weight, and injection amount of 50 $\mu$L.) The number-average molecular weight is a value converted with calibration curves for the following standard polystyrenes (manufactured by Waters Inc.; $1.75 \times 10^6$, $4.1 \times 10^5$, $1.12 \times 10^5$, $3.5 \times 10^4$, $8.5 \times 10^3$).

Properties of the asphalt compositions were determined in the following manners.

Softening Point (Ring & Ball Method)

Measured in accordance with JIS-K 2207. A sample was packed into a specified ring, which was held horizontally in liquid glycerol. A 3.5-g ball was placed in the center of the sample, and the liquid temperature was elevated at a rate of 5° C./min. The temperature at which the sample came into contact with the bottom plate of the ring table due to the weight of the ball was measured.

Melt Viscosity

Measured at 180° C. with a Brookfield viscometer.

Penetration

The length over which a specified needle penetrated in 5 seconds into a sample kept at 25° C. in a thermostatic water bath was measured in accordance with JIS-K 2207.

Elongation

Elongation was determined in accordance with JIS-K 2207. A sample was poured into a mold and thereby formed into a specified shape. Thereafter, this sample was kept at 4° C. in a thermostatic water bath and then pulled at a rate of 5 cm/min. The distance over which the sample was elongated before breakage was measured.

High-Temperature Storage Stability

Immediately after production of an asphalt composition, the asphalt composition was poured into an aluminum can having an inner diameter of 50 mm and a height of 130 mm so that the composition filled the aluminum can up to the brim. This can was placed in a 180° C. oven, taken out thereof after 24 hours, and allowed to cool naturally. subsequently, the asphalt composition cooled to room temperature was sampled at 4 cm from the lower end and at 4 cm from the upper end. The softening point of the upper layer part and that of the lower layer part were measured. The difference in softening point was used as a measure of high-temperature storage stability.

On the other hand, properties of the resin compositions were determined in the following manners.

Dart Impact Strength

Measured at 23° C. in accordance with ASTM D-1709, except that a weight shape having a radius of ½ inch was used. The value at 50% breakage was determined.

Tensile Modulus and Elongation at Break of Sheet

Measured at a pulling rate of 5 mm/min with respect to the sheet extrusion direction and the direction perpendicular thereto. The test pieces had a width of 12.7 mm and the bench mark distance was 50 mm.

Haze

A liquid paraffin was applied to the surface of a sheet or film, and the haze was measured in accordance with ASTM D1003.

Extrudability A

A sheet having a thickness of 0.3 mm was continuously molded for 6 hours using a 40-mm sheet extruder under the conditions of an extrusion temperature of 235° C. The sheets obtained respectively at 5 minutes and at 6 hours after initiation of the operation were examined to count the number of gels of 0.5 mm or larger (crosslinked polymer) in an area of 300 $cm^2$. The difference in number was counted to evaluate extrudability (A: the difference is smaller than 20, B: the difference is from 20 to 40, C: the difference exceeds 40).

Extrudability B

A resin composition was extruded with a 30-mm twin-screw extruder at 220° C. and the pellets obtained were further extruded under the same conditions. This operation was repeatedly conducted five times. The pellets obtained after the first operation and the pellets obtained after the fifth operation each were fed to a screw in-line type injection molding machine set at 220 to 180° C. and injection-molded into test pieces under the conditions of a mold temperature of 40° C. The test pieces obtained were examined for the following properties to evaluate extrudability based on the retention of each property.

Izod impact strength: measured at 23° C. in accordance with ASTM D-256.

Tensile strength, tensile elongation: measured at 23° C. in accordance with ASTM D-638.

Asphalt Compositions

Examples 1 to 5 and Comparative Examples 1 to 4

The following test was conducted according to the formulations shown in Table 2. Into a 750-mL metal can was charged 400 g of straight asphalt 60-80 [manufactured by Nippon Oil Co., Ltd.]. This metal can was sufficiently immersed in a 180° C. oil bath. Subsequently, a given amount of a block copolymer was added little by little to the molten asphalt with stirring. After completion of the addition, the resultant mixture was stirred for 90 minutes at a rotational speed of 5,000 rpm to prepare an asphalt composition. Properties thereof are shown in Table 2.

As apparent from Table 2, the asphalt compositions of the invention had an excellent balance among properties and showed excellent high-temperature storage stability and low-temperature elongation characteristics.

Resin Compositions

Examples 6 to 8 and Comparative Examples 5 to 9

Resin compositions prepared from a block copolymer as ingredient (A) and a styrene resin as ingredient (B) according to the formulations shown in Table 3 were molded into a sheet having a thickness of 0.35 mm with a 40-mm sheet extruder at an extrusion temperature of 200° C. The dart impact strength, tensile modulus, elongation at break, and haze thereof were measured by the methods shown above.

Furthermore, extrudability A was examined by the method described above as a measure of resin composition alteration during extrusion. As a result, the resin compositions of the invention were found to be resin compositions excellent in mechanical properties and extrudability.

Example 9 and Comparative Example 10

The dart impact strength of the resin composition sheet obtained in Example 7 was measured at −20° C. As a result, it was found to be 64 kgf-cm. The retention based on the dart impact strength as measured at 23° C. was 76% (Example 9).

On the other hand, a resin composition was obtained in the same manner as in Example 7, except that polymer 12 was used as a block copolymer in place of polymer 11. This resin composition was molded into a sheet and the dart impact strength thereof was measured at 23° C. and −20° C. As a result, the retention of −20° C. dart impact strength based on the dart impact strength as measured at 23° C. was 10%, showing that this resin composition was considerably inferior to the resin composition of the invention (Comparative Example 10).

Examples 10 and 11 and Comparative Examples 11 and 12

Resin compositions prepared from a block copolymer as ingredient (A) and a styrene resin and a polyolefin resin as ingredient (B) according to the formulations shown in Table 4 were evaluated for extrudability B using a 30-mm twin-screw extruder. As a result, the resin compositions of the invention were found to be resin compositions having excellent suitability for repetitions of extrusion (reworking).

Example 12 and Comparative Example 13

A resin composition was obtained which was composed of 10 parts by weight of polymer 11 as ingredient (A) and a combination of 60 parts by weight of a styrene/butadiene block copolymer resin having a styrene content of 75% by weight and an MFR of 7 g/10 min and 30 parts by weight of a styrene/n-butyl acrylate copolymer having an n-butyl acrylate content of 16% by weight and an MFR of 3 g/10 min as ingredient (B) (Example 12).

On the other hand, a resin composition having the same makeup as in Example 12 except that polymer 12 was used in place of polymer 11 as ingredient (A) was subjected as a Comparative Example to sheet extrusion to obtain a sheet (Comparative Example 13).

The sheets obtained were evaluated for extrudability A. As a result, Example 12 was rated as "A", whereas Comparative Example 13 was rated as "C".

Example 13 and Comparative Example 14

Ten parts by weight of polymer 21 as ingredient (A) and a combination of 50 parts by weight of poly(2,6dimethyl-1,4-phenylene ether) (hereinafter referred to as poly(phenylene ether)) having a reduced viscosity of 0.5, 20 parts by weight of the polystyrene used in Example 6, and 20 parts by weight of the polypropylene used in Example 10 as ingredient (B) were melt-polykneaded with a 30-mm twin-screw extruder set at 260 to 280° C. to obtain a pellet-form resin composition (Example 13).

Furthermore, a resin composition as a Comparative Example was obtained which had the same makeup as in Example 13, except that polymer 22 was used in place of polymer 21 as ingredient (A) (Comparative Example 14).

These pellets were used and fed to a screw in-line type injection molding machine set at 240 to 280° C. and injection-molded into flat test plates under the conditions of a mold temperature of 60° C.

The flat plate obtained in Example 13 was glossy and had a satisfactory appearance, whereas the flat plate obtained in Comparative Example 14 was not glossy and had a poor appearance.

Example 14 and Comparative Example 15

Eight parts of polymer 11 as ingredient (A) and a combination of 46 parts of a styrene/butadiene copolymer having a styrene content of 77% (MI=6) and 46 parts of the styrene/n-butyl acrylate copolymer used in Example 12 as ingredient (B) were subjected to sheet extrusion at 180° C. and taken off with a roll to obtain a sheet having a thickness of 0.6 mm. This sheet was further stretched 4 times at 95° C. to produce a film. The film obtained was subjected to an elongation test at 0° C. As a result, it showed an elongation of 240%. A piece of the sheet obtained was further subjected to an MI residence test in which the piece was held in an MI meter at 245° C. for 1 hour. As a result, the MI retention thereof was found to be 65% (Example 14).

Furthermore, a sheet and a film as a Comparative Example were obtained which had the same composition as in Example 14, except that polymer 12 was used in place of polymer 11 as ingredient (A). The film obtained showed an elongation at 0° C. of 190%. However, in an MI residence test of a piece of the sheet, the MI retention thereof was 20%, which was far lower than in Example 14. This composition had a poor balance between film properties and thermal stability (Comparative Example 15).

Example 15 and Example 16

Four parts by weight of polymer 10 as ingredient (A), a combination of 67 parts by weight of the same impact-resistant polystyrene as that used in Example 10 and 29 parts by weight of a propylene homopolymer as ingredient (B), and 4 parts by weight of a hydrogenated block copolymer (degree of hydrogenation, 95%) obtained by hydrogenating a block copolymer of an ABA structure having a styrene content of 67% by weight, molecular weight of 60,000, and vinyl bond amount of 35% as ingredient (C) were melt-kneaded with a 30-mm twin-screw extruder set at 200 to 220° C. to obtain a pellet-form resin composition (Example 15).

Properties of the resin composition obtained were a tensile strength of 290 kg/cm2, tensile elongation of 100%, and Izod impact strength of 8 kg·cm/cm.

A resin composition was further obtained in the same manner as in Example 15, except that a hydrogenated block copolymer having a degree of hydrogenation of 55% was used as ingredient (C) (Example 16). The resin composition obtained was a resin composition having excellent properties as in Example 15.

Furthermore, the resin compositions of Examples 15 and 16 each were molded into a sheet having a thickness of 0.3 mm with a 40-mm sheet extruder at an extrusion temperature of 220° C. The sheets obtained had a satisfactory surface appearance.

TABLE 1(1)

| Sample No. | Structure | Styrene content (wt %) | Vinyl content (wt %) | Weight ratio of isoprene to butadiene | Mn (×10⁴) |
|---|---|---|---|---|---|
| Polymer 1 | S(15)-I(14)/B(56)-S(15) | 30 | 13 | 20/80 | 10 |
| Polymer 2 | S(15)-I(24.5)/B(45.5)-S(15) | 30 | 13 | 35/65 | 12 |
| Polymer 3 | S(15)-B(70)-S(15) | 30 | 13 | 0/100 | 9.5 |
| Polymer 4 | S(15)-I(70)-S(15) | 30 | 13 | 100/0 | 14 |
| Polymer 5 | S(15)-I(14)/B(56)-S(15) | 30 | 60 | 20/80 | 11 |
| Polymer 6*[1] | S(15)-I(24.5)/B(45.5)-S(15) 70% S(30)-I(24.5)/B(45.5) 30% | 30 | 13 | 35/65 | 14 |
| Polymer 7 | S(15)-I(28)/B(39.2)/S(2.8)-S(15) | 30 | 13 | 41.5/58.5 | 12 |
| Polymer 8 | S(15)-I(28)/B(36.4)/S(5.6)-S(15) 70% S(30)-I(28)/B(36.4)/I(5.6) 30% | 30 | 18 | 43.5/56.5 | 15 |
| Polymer 9*[1] | S(15)-I(24.5)/B(45.5)-S(15) 70% S(30)-I(24.5)/B(45.5) 30% | 30 | 50 | 35/65 | 11 |
| Polymer 10 | S(20)-I(21)/B(39)-S(20) | 40 | 13 | 35/65 | 11 |
| Polymer 11 | S(20)-I(33)/B(27)-S(20) | 40 | 13 | 55/45 | 12 |
| Polymer 12 | S(20)-B(60)-S(20) | 40 | 13 | 0/100 | 9 |
| Polymer 13 | S(20)-I(60)-S(20) | 40 | 13 | 100/0 | 13 |
| Polymer 14 | S(20)-I(21)/B(39)-S(20) | 40 | 60 | 35/65 | 11 |
| Polymer 15 | S(35)-I(13.5)/B(16.5)-S(35) | 70 | 13 | 45/55 | 12 |
| Polymer 16 | I(3.5)/B(6.5)-S(10)-I(24.5)/B(45.5)-S(10) | 20 | 13 | 35/65 | 14 |
| Polymer 17 | B(10)-S(10)-B(70)-S(10) | 20 | 13 | 0/100 | 14 |
| Polymer 18 | S(20)-I(48)/B(12)-S(20) | 40 | 13 | 80/20 | 12 |
| Polymer 19 | S(15)-I(15)/B(50)/S(5)-S(15) | 35 | 18 | 23/77 | 12 |
| Polymer 20 | S(15)-I(1.5)/B(63.5)/S(5)-5(15) | 35 | 18 | 2/98 | 11 |
| Polymer 21*[1] | (S(30)-I(24.5)/B(45.5))₄-x | 30 | 13 | 35/65 | 20 |
| Polymer 22*[1] | (S(30)-B(70))₄-x | 30 | 13 | 0/100 | 18 |

*[1]The following compounds were used as coupling agents.
Polymers 6, 8, 9: ethyl benzoate
Polymers 21 and 22: silicon tetrachloride
*[2]The following stabilizers were added to the respective polymers. The addition amounts of the stabilizers are amounts per 100 parts by weight of the block copolymer.
Polymers 1 to 9: B/C = 0.05/0.15
Polymers 10 to 15, 18, 21, and 22: A/B/C = 0.2/0.08/0.2
Polymers 16, 17, 19, and 20: A/B/D = 0.2/0.1/0.2
<Kinds of stabilizers>
Stabilizer A: 2-t-butyl-6-(3-t-butyl-2-hydroxy-5-methylbenzyl)-4-methylphenyl acrylate
Stabilizer B: 2,4-bis[(octylthio)methyl]o-cresol
Stabilizer C: n-octadecyl 3-(3,5-di-t-butyl-4-hydroxyphenyl)propionate
Stabilizer D: tetrakis [methylene-3-(3,5-di-t-butyl-4-hydroxyphenyl)propionato]methane

TABLE 2

| | Block copolymer | | Amount of asphalt (parts by weight) | Softening point (° C.) | Melt viscosity (cP) | Penetration (1/10 mm) | Elongation at 4° C. (cm) | High-temperature storage stability, Difference in softening point (° C.) |
|---|---|---|---|---|---|---|---|---|
| | Kind | Amount (parts by weight) | | | | | | |
| Ex. 1 | polymer 1 | 8 | 100 | 97 | 420 | 43 | 43 | 23 |
| Ex. 2 | polymer 2 | 8 | 100 | 98 | 380 | 45 | 41 | 20 |
| Ex. 3 | polymer 6 | 8 | 100 | 97 | 370 | 44 | 46 | 20 |
| Ex. 4 | polymer 7 | 8 | 100 | 98 | 370 | 40 | 40 | 11 |
| Ex. 5 | polymer 8 | 8 | 100 | 96 | 410 | 42 | 47 | 14 |
| Comp. Ex. 1 | polymer 3 | 8 | 100 | 96 | 460 | 42 | 42 | 38 |
| Comp. Ex. 2 | polymer 4 | 8 | 100 | 98 | 320 | 55 | 23 | 28 |
| Comp. Ex. 3 | polymer 5 | 8 | 100 | 98 | 430 | 41 | 22 | 35 |
| Comp. Ex. 4 | polymer 9 | 8 | 100 | 96 | 420 | 42 | 21 | 31 |

TABLE 3

|  | Amount (wt %)*3) | | Kind of ingredient | Dart impact strength | Tensile modulus | Haze | |
| --- | --- | --- | --- | --- | --- | --- | --- |
|  | Ingredient (A) | Ingredient (B) | (A) | (kgf · cm) | MPa | (%) | Extrudability A |
| Ex. 6 | 15 | 85 | polymer 10 | 87 | 2210 | 26 | A |
| Ex. 7 | 15 | 85 | polymer 11 | 85 | 2220 | 25 | A |
| Ex. 8 | 15 | 85 | polymer 18 | 83 | 2230 | 24 | A |
| Comp. Ex. 5 | 15 | 85 | polymer 12 | 90 | 2200 | 26 | C |
| Comp. Ex 6 | 1 | 99 | polymer 10 | <50 | 3300 | <5 | A |
| Comp. Ex. 7 | 15 | 85 | polymer 14 | 62 | 2100 | 27 | C |
| Comp. Ex. 8 | 15 | 99 | polymer 15 | <50 | 2800 | <5 | A |
| Comp. Ex. 9 | 50 | 50 | polymer 11 | >150 | <1500 | >50 | C |

*3)Ingredient (B) was polystyrene (A & M Polystyrene 685, manufactured by A & M Styrene Co., Ltd.)

TABLE 4

|  | Amount (wt %) | | | Kind of ingredient (A) | Retention of izod impact strength (%) | Retention of tensile elongation (%) |
| --- | --- | --- | --- | --- | --- | --- |
|  | Ingredient (A) | HIPS*4) | PP*5) | | | |
| Ex. 10 | 9 | 64 | 27 | polymer 10 | 84 | 58 |
| Ex. 11 | 9 | 64 | 27 | polymer 16 | 74 | 61 |
| Comp. Ex. 11 | 9 | 64 | 27 | polymer 12 | 76 | 35 |
| Comp. Ex. 12 | 9 | 64 | 27 | polymer 17 | 53 | 20 |

*4)Impact-resistant polystyrene (A & M Polystyrene 475D, manufactured by A & M Ltd.) was used.
*5)Propylene homopolymer (SunAllomer PL500A, manufactured by Montel SDK Sunrise) was used.

*4) Impact-resistant polystyrene (A&M Polystyrene 475D, manufactured by A&M Styrene, Ltd.) was used.
*5) Propylene homopolymer (SunAllomer PL500A, manufactured by Montel SDK Sunrise) was used.

While the invention has been described in detail and with reference to specific embodiments thereof, it will be apparent to one skilled in the art that various changes and modifications can be made therein without departing from the spirit and scope thereof.

This application is based on a Japanese patent application filed on Aug. 13, 2001 (Patent Application 2001-245237) and a Japanese patent application filed on Aug. 15, 2001 (Patent Application 2001-246474), the contents thereof being hereby incorporated by reference.

<Industrial Applicability>

The invention provides an asphalt composition excellent in high-temperature storage stability and low-temperature characteristics and having a satisfactory balance among asphalt properties. The asphalt composition of the invention can be utilized in applications such as road paving applications, roofing/waterproof sheet applications, and sealant applications.

Furthermore, the resin composition of the invention comprising a combination of a thermoplastic resin selected from styrene resins, polyolefin resins, and poly(phenylene ether) resins with a block copolymer comprising a vinylaromatic hydrocarbon, isoprene and 1,3-butadiene, and having a specific polymer structure is effective in reducing the gel formation due to a block copolymer crosslinking reaction during molding to thereby considerably reduce the gel level (fish eyes) and in simultaneously reducing the melt viscosity change due to crosslinking and cleavage of block copolymer chains and attaining excellent low-temperature impact resistance, etc.

Moreover, in the resin composition of the invention which comprises a combination of a thermoplastic resin selected from styrene resins, polyolefin resins, and poly(phenylene ether) resins with a specific hydrogenated block copolymer and a block copolymer comprising a vinylaromatic hydrocarbon, isoprene and 1,3-butadiene, and having a specific polymer structure, the specific hydrogenated block copolymer improves the compatibility of the styrene resin and/or poly(phenylene ether) resin with the polyolefin resin, while the block copolymer comprising a vinylaromatic hydrocarbon, isoprene and 1,3-butadiene, and having a specific polymer structure blends preferentially with the styrene resin and/or poly(phenylene ether) resin to form a homogeneous mixture and thereby improve impact resistance.

The resin compositions of the invention can be molded, as they are or after having been colored, by the same processing techniques as for ordinary thermoplastic resins and used in various applications so as to take advantage of the effects described above. For example, they can be molded by injection molding, blow molding, or the like into OA apparatus parts, utensils for daily use, or containers for foods, sundry goods, parts for light electrical appliances, etc. In particular, owing to the feature that they have a reduced gel content, satisfactory appearance, and excellent balance among properties, the compositions are suitable for use as thin films such as food wrap films, films for laminating, and heat-shrinkable films or as transparent sheet moldings such as trays for foods or for parts for light electrical appliances, etc., blister cases, or the like.

What is claimed is:

1. A composition comprising:
   (A) from 2 to 40 parts by weight of a block copolymer which is a block copolymer having at least two polymer blocks comprising at least 70% by weight of a vinylaromatic hydrocarbon and further having at least one copolymer block comprising isoprene and 1,3-butadiene and/or at least one copolymer block comprising isoprene, 1,3-butadiene and a vinylaromatic hydrocarbon, the block copolymer having a vinylaromatic hydrocarbon content of from 5% by weight to less than 60% by weight and a total content of isoprene and 1,3-butadiene of from more than 40% by weight to 95% by weight, and the block copolymer having an isoprene/1,3-butadiene weight ratio in the range of from 95/5 to 5/95, a vinyl bond amount less than 40% by weight, and a number-average molecular weight in the range of from 30,000 to 500,000; and (B) from 98 to 60 parts by weight of either at least one thermoplastic resin selected from styrene resins, polyolefin resins and poly(phenylene ether) resins, or an asphalt.

2. A resin composition comprising:

(A) from 2 to 40 parts by weight of a block copolymer which is a block copolymer having at least one polymer block comprising at least 70% by weight of a vinylaromatic hydrocarbon and further having at least one copolymer block comprising isoprene and 1,3-butadiene and/or at least one copolymer block comprising isoprene, 1,3-butadiene and a vinylaromatic hydrocarbon, the block copolymer having a vinylaromatic hydrocarbon content of from 5% by weight to less than 60% by weight and a total content of isoprene and 1,3-butadiene of from more than 40% by weight to 95% by weight, and the block copolymer having an isoprene/1,3-butadiene weight ratio in the range of from 95/5 to 5/95, a vinyl bond amount less than 30% by weight, and a number-average molecular weight in the range of from 30,000 to 500,000; and (B) from 98 to 60 parts by weight of at least one thermoplastic resin selected from styrene resins, polyolefin resins and poly(phenylene ether) resins.

3. A resin composition obtained by compounding 100 parts by weight of a resin composition comprising:

(A) from 2 to 40 parts by weight of a block copolymer which is a block copolymer having at least two polymer blocks comprising at least 70% by weight of a vinylaromatic hydrocarbon and further having at least one copolymer block comprising isoprene and 1,3-butadiene and/or at least one copolymer block comprising isoprene, 1,3-butadiene and a vinylaromatic hydrocarbon, the block copolymer having a vinylaromatic hydrocarbon content of from 5% by weight to less than 60% by weight and a total content of isoprene and 1,3-butadiene of from more than 40% by weight to 95% by weight, and the block copolymer having an isoprene/1,3-butadiene weight ratio in the range of from 95/5 to 5/95, a vinyl bond amount less than 40% by weight, and a number-average molecular weight in the range of from 30,000 to 500,000; and (B) from 98 to 60 parts by weight of at least one thermoplastic resin selected from styrene resins, polyolefin resins and poly(phenylene ether) resins, with (C) from 2 to 30 parts by weight of a hydrogenated block copolymer comprising a vinylaromatic hydrocarbon and a conjugated diene and having a vinylaromatic hydrocarbon content of from 5 to 90% by weight and a degree of hydrogenation of 20% or higher.

4. A resin composition obtained by compounding 100 parts by weight of a resin composition comprising:

(A) from 2 to 40 parts by weight of a block copolymer which is a block copolymer having at least two polymer blocks comprising at least 70% by weight of a vinylaromatic hydrocarbon and further having at least one copolymer block comprising isoprene and 1,3-butadiene and/or at least one copolymer block comprising isoprene, 1,3-butadiene and a vinylaromatic hydrocarbon, the block copolymer having a vinylaromatic hydrocarbon content of from 5% by weight to less than 60% by weight and a total content of isoprene and 1,3-butadiene of from more than 40% by weight to 95% by weight, and the block copolymer having an isoprene/1,3-butadiene weight ratio in the range of from 95/5 to 5/95, a vinyl bond amount less than 30% by weight, and a number-average molecular weight in the range of from 30,000 to 500,000; and (B) from 98 to 60 parts by weight of at least one thermoplastic resin selected from styrene resins, polyolefin resins and poly(phenylene ether) resins, with (C) from 2 to 30 parts by weight of a hydrogenated block copolymer comprising a vinylaromatic hydrocarbon and a conjugated diene and having a vinylaromatic hydrocarbon content of from 5 to 90% by weight and a degree of hydrogenation of 20% or higher.

5. A composition comprising:

(A) from 2 to 40 parts by weight of a linear block copolymer which is a block copolymer having at least two polymer blocks comprising at least 70% by weight of a vinylaromatic hydrocarbon and further having at least one copolymer block comprising isoprene and 1,3-butadiene and/or at least one copolymer block comprising isoprene, 1,3-butadiene and a vinylaromatic hydrocarbon, the block copolymer having a vinylaromatic hydrocarbon content of from 5% by weight to less than 60% by weight and a total content of isoprene and 1,3butadiene of from more than 40% by weight to 95% by weight, and the block copolymer having an isoprene/1,3-butadiene weight ratio in the range of from 95/5 to 5/95, a vinyl bond amount less than 40% by weight, and a number-average molecular weight in the range of from 30,000 to 500,000; and (B) from 98 to 60 parts by weight of an asphalt.

6. The composition of any one of claims 1 to 5, to which at least one stabilizer selected from the group consisting of 2-[1-(2-hydroxy-3,5-di-t-pentylphenyl)ethyl]-4,6di-t-pentylphenyl acrylate, 2-t-butyl-6-(3-t-butyl-2-hydroxy-5-methylbenzyl)-4-methylphenyl acrylate, and 2,4-bis [(octylthio)methyl](octylthio)methyl]-o-cresol has been added as a stabilizer in an amount of from 0.05 to 3 parts by weight per 100 parts by weight of the block copolymer.

* * * * *